United States Patent [19]

Bracken et al.

[11] Patent Number: 5,590,002
[45] Date of Patent: Dec. 31, 1996

[54] COMPLIANT ANCHOR FOR SECURING DISK DRIVE ACTUATOR BEARING

[75] Inventors: Allen T. Bracken, Layton; Edward L. Rich, Ogden, both of Utah

[73] Assignee: Iomega Corporation, Roy, Utah

[21] Appl. No.: 377,033

[22] Filed: Jan. 23, 1995

[51] Int. Cl.⁶ .............................. G11B 33/14; G11B 5/54
[52] U.S. Cl. ........................................ 360/97.02; 360/106
[58] Field of Search ............................ 360/97.01–97.03, 360/98.01, 105, 106

[56] References Cited

U.S. PATENT DOCUMENTS

| | | | |
|---|---|---|---|
| 4,881,139 | 11/1989 | Hazebrouck | 360/106 |
| 5,168,185 | 12/1992 | Umehara et al. | 360/106 |
| 5,214,549 | 5/1993 | Baker et al. | 360/97.02 |
| 5,291,355 | 3/1994 | Hatch et al. | 360/99.08 |

FOREIGN PATENT DOCUMENTS 1-113980  5/1989  Japan.
5-274822  10/1993  Japan .................................. 360/106

OTHER PUBLICATIONS

"An Introduction to the Insite 325 Floptical® Disk Drive", Jim Goodwin, Insite Peripherals, Inc., Presented at SPIE Optical Data Storage Topical Meeting (1989).

*Primary Examiner*—Jefferson Evans
*Attorney, Agent, or Firm*—Woodcock Washburn Kurtz Mackiewicz & Norris

[57] ABSTRACT

In a magnetic disk drive, a compliant member connects the top of the bearing assembly for the actuator arm to the drive. The member is compliant in the vertical direction and stiff in the horizontal direction to resist actuation forces being applied to the bearing assembly when the actuator rotates the arm. The actuator arm has a fork with a shelf on which the coil is mounted.

10 Claims, 4 Drawing Sheets

COMPLIANT ANCHOR FOR SECURING DISK DRIVE ACTUATOR BEARING

BACKGROUND OF THE INVENTION

This invention relates to disk drives for storing information, and more particularly, to an actuator arm assembly for a disk drive.

Disk drives have an actuator arm which moves magnetic read/write heads into engagement with a recording media, either a flexible disk or a rigid disk in a removable cartridge.

Most disk drives contain an actuator bearing assembly around which an arm, holding the read/write transducer, pivots. Forces (and therefore torques) are imparted to the actuator arm by means of an actuator, usually a voice coil motor, or such. These forces, besides providing the torques required to actuate the arm, tend to deflect the actuator arm and bearing assembly, and therefore, the read/write transducers, in an undesirable direction, the "in-plane" direction. In order to reduce such deflections, many disk drives have the top of the bearing assembly secured to a rigid structural member, such as a stiff top cover or the steel part of the magnet assembly. The bottom is usually attached to a base casting, or plate. This anchors both the top and bottom of the bearing assembly and allows for a much stiffer bearing assembly.

However, as the bearing assembly is being attached to that rigid structural member, the bearing assembly can be significantly tilted so as to introduce unwanted distortion. This can be especially a problem if the stiffness or parallelism of the base casting (or plate) is poor (or competes) with the stiffness and parallelism of the other rigid structural members.

It is an object of the present invention to reduce the deflection of the actuator arm due to the forces applying torque to the arm, while avoiding the unwanted distortion introduced by prior art techniques of securing the bearing assembly to a structural member.

Disk drive actuators usually have a fork-like structure at one end to attach a coil such as that of a rotary voice coil motor. Such a fork can make it difficult to locate the coil, especially in the vertical direction, while trying to attach the coil, as with an adhesive or other potting method.

It is another object of the present invention to provide an improved technique of locating the coil on the actuator arm.

SUMMARY OF THE INVENTION

In accordance with the present invention, a compliant member secures the top of the bearing assembly. The compliance is in the vertical direction. The strap is stiff in the direction of the actuation forces (the "in-plane" direction). As the top of the bearing assembly is being secured, the compliant member or anchor easily deflects and adjusts to the bearing assembly position rather than the bearing assembly adjusting to the anchor. This introduces minimal tilt or other distortion of the pivot. Once secured, the "in-plane" stiffness of the anchor predominates and reduces "in-plane" deflections to an acceptable level.

This compliance in the vertical direction and stiffness in the "in-plane" direction can be accomplished by use of a separate strap or can be incorporated into existing parts, such as the top cover or the steel part of the magnet.

By adding a shelf for the coil to rest on during the attachment operation a shelf fixturing feature is provided, thus a better and more cost-effective location is obtained as well as greater ease of attachment is facilitated.

The shelf also allows the coil to be more robustly anchored to the actuator arm. Mechanical shock and vibration cannot loosen the coil as easily because there is no direction where pure shear is placed on any joint. The additional mass on the actuator arm underneath the end of the coil also can help counterbalance a rotary actuator arm. The better balanced a rotary actuator arm and coil assembly, the less sensitive the system is to rectilinear vibration and mechanical shock. This is especially true if the arm has additional mass as caused by an abrupt angled arm.

The foregoing and other objects, advantages and features of the invention will be better understood from the following more detailed description and appended claims.

SHORT DESCRIPTION OF THE DRAWINGS

DESCRIPTION OF THE PREFERRED EMBODIMENT

Figure 1:
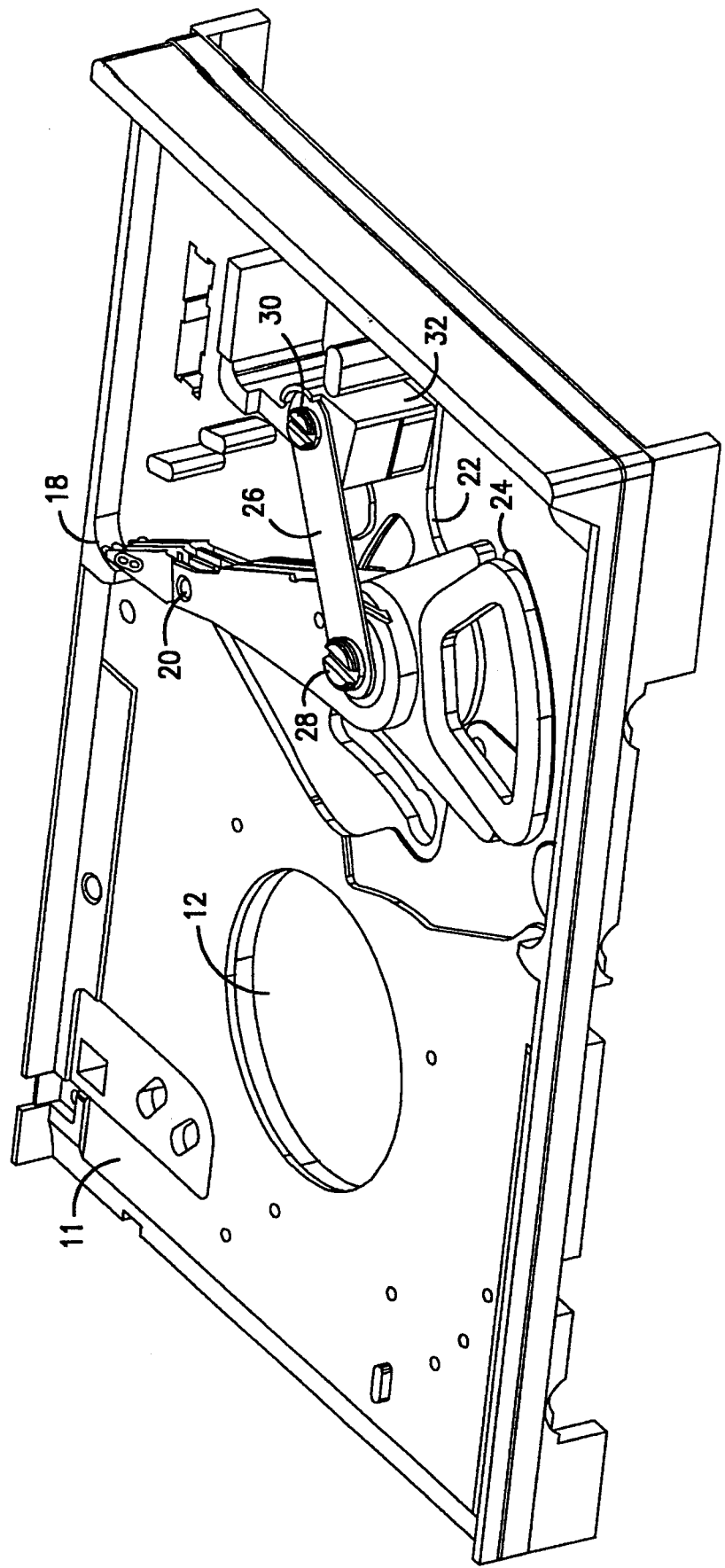
FIG. 1 shows a disk drive in accordance with the present invention.
Figure 2:
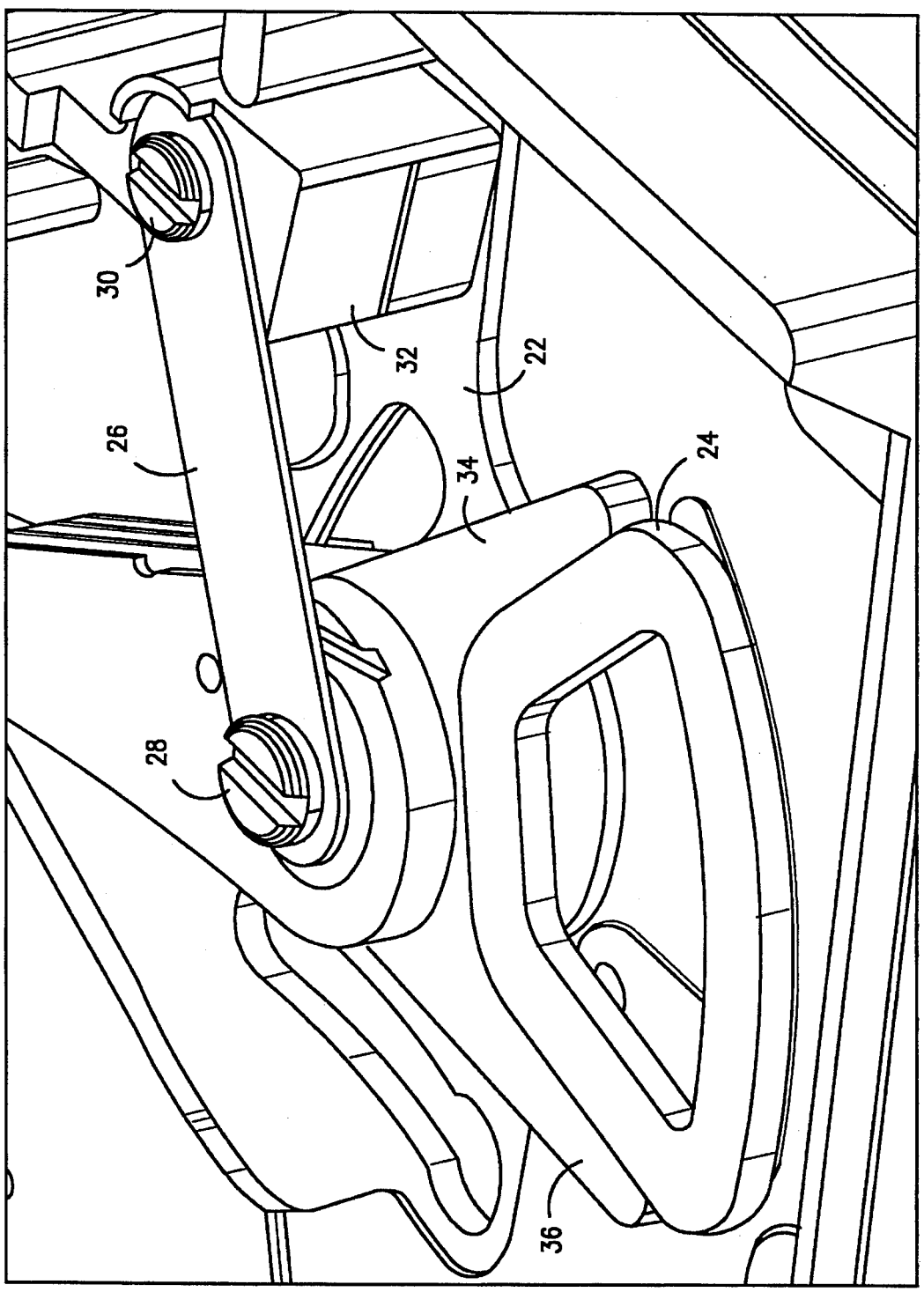
FIG. 2 shows the compliant strap in more detail.
Figure 5:
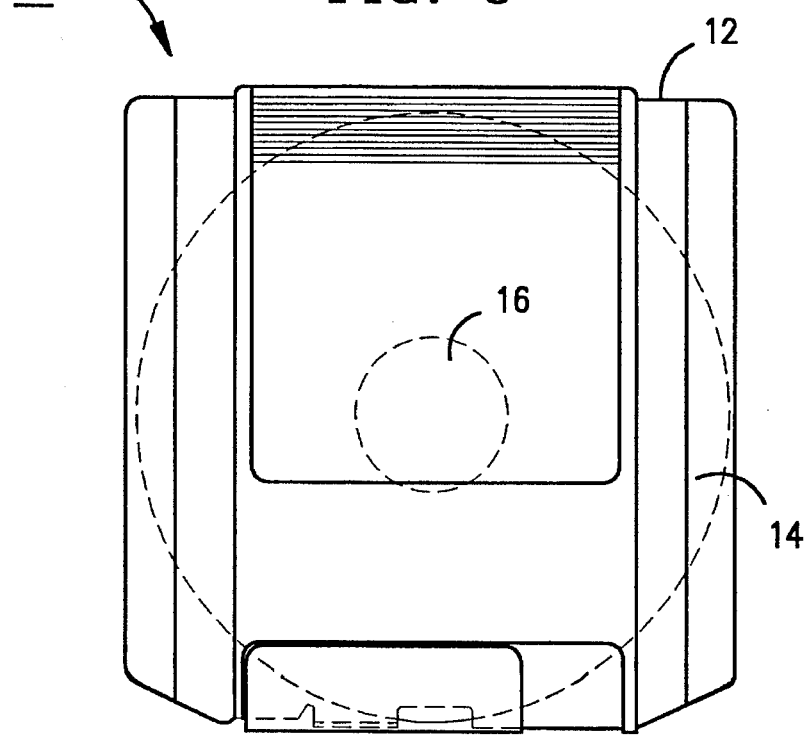
FIG. 5 shows a cartridge of the type used with the invention.

FIG. 1 shows a disk drive of the type for use with a cartridge 10 (FIG. 5) which contains a recording media 14. The cartridge is inserted into the drive at 11. A motor at 12 rotates the media in the cartridge. The cartridge shown in FIG. 5 has a disk 14 with a hub 16 rotatably mounted therein to be rotated by the motor.

Figure 4:
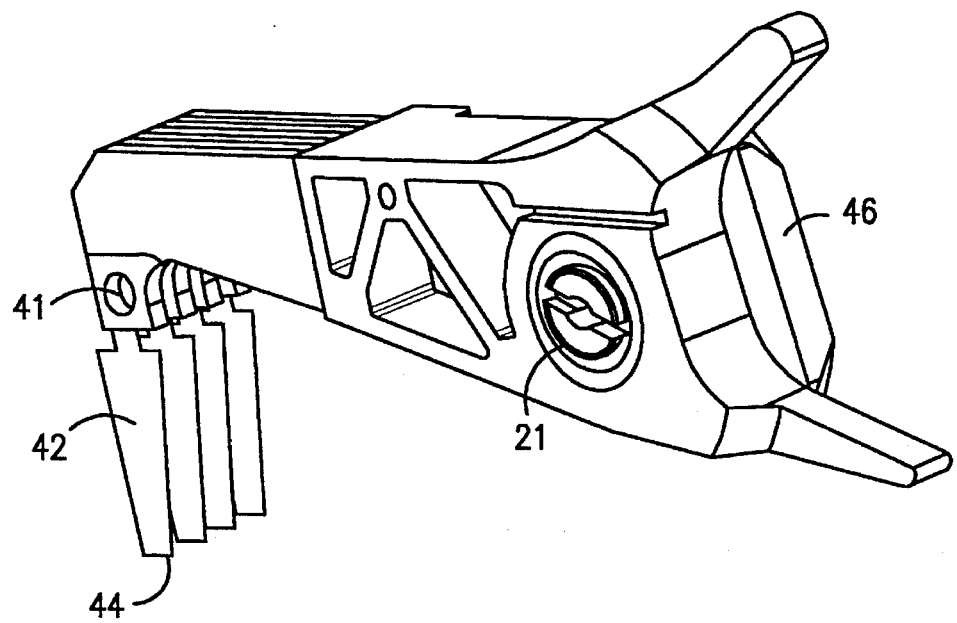
FIG. 4 shows an alternate embodiment of an arm with a shelf for holding the coil.

The disk is engaged by read/write heads 18 which are carried by the arm 20. Arm 20 pivots around an actuator bearing assembly 21 (FIG. 4) mounted on the baseplate 22. An actuator for rotating the arm includes a voice coil motor with a coil 24.

In accordance with the present invention, a compliant strap 26 connects the top of the bearing assembly to the drive. More particularly, the strap 26 is secured to the top of the actuator bearing assembly by the screw 28 and is secured by a screw 30 to the casting 32 which is part of the baseplate 22. The strap 26 is compliant in the vertical direction, but is stiff in the direction of the actuation forces applied to the bearing assembly when the actuator rotates the arm 20.

Figure 3:
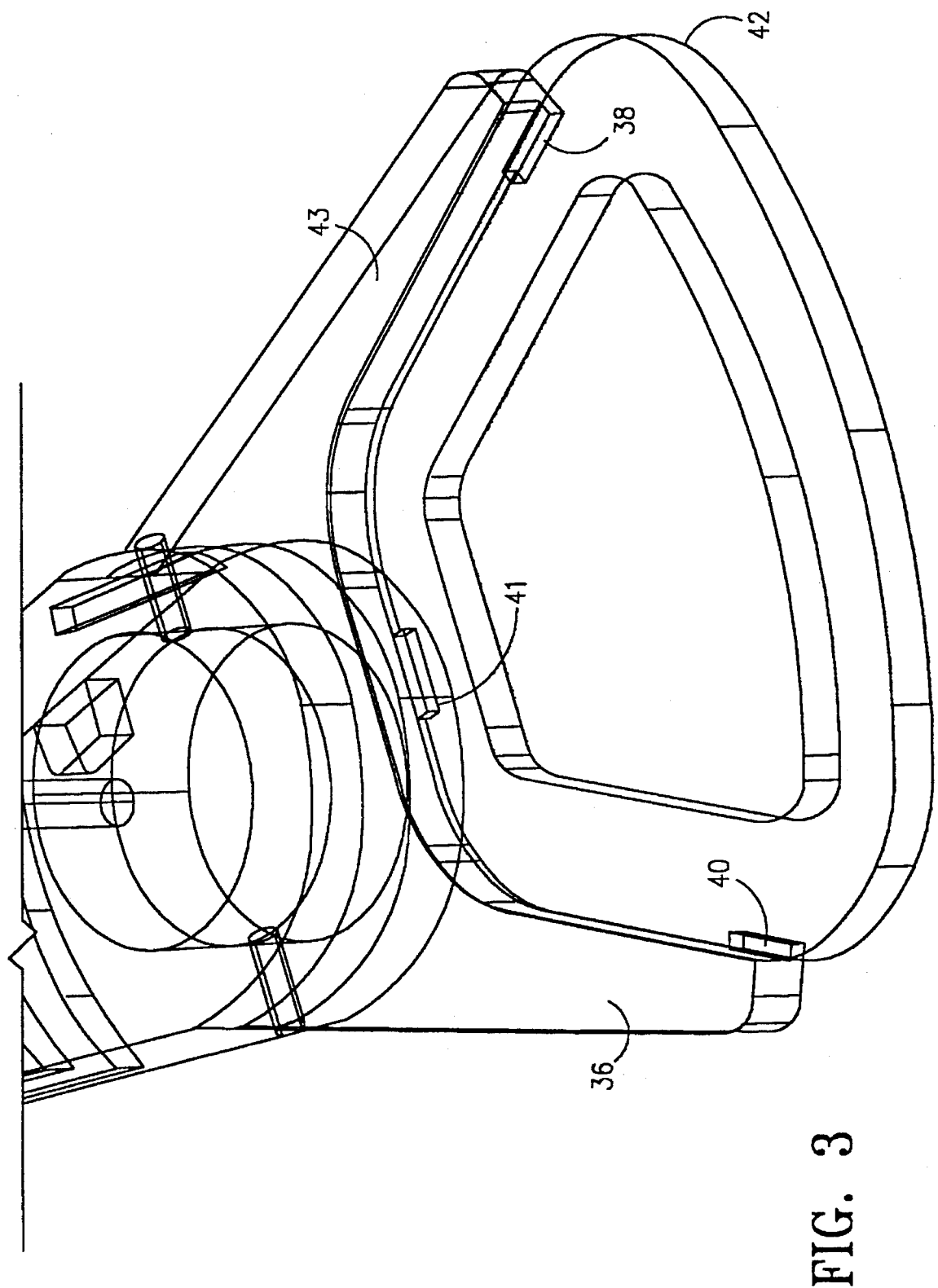
FIG. 3 shows the shelves in the fork of the actuator arm.

As shown in FIG. 3, the end of the actuator arm which holds the coil 24 is in the form of a fork having tines 34 and 36. These tines each have shelves 38, 40 and 41 which allow the coil 24 to be securely anchored to the actuator arm. The additional mass of these shelves on the actuator arm underneath the end of the coil helps counterbalance the actuator arm. This is a particular advantage for a dog-legged actuator arm of the type shown in FIG. 4.

In this type of actuator arm, head suspensions 42 carrying read/write heads 44 are secured at 41 to the actuator arm in a dog-leg arrangement. In this embodiment, the shelf 46 has a particular advantage of counterbalancing the actuator arm.

The foregoing and other objects, features and advantages of the invention will be better understood from the following more detailed description and appended claims.

What is claimed is:

1. A magnetic disk drive in which recording media is engaged by read/write heads comprising:

a base;

an arm carrying said read/write heads into engagement with said media;

a body having a side from which said arm projects and another side;

a fork having tines which extend from said other side of said body;

an actuator bearing assembly around which said arm and said body pivots, said assembly being mounted to said base;

an actuator including a coil in said fork for rotating said arm;

shelves including a shelf extending across the bottom edge of said other side of said body between said tines of said fork for holding said coil;

a projection extending upwardly from said base and being unitary with said base; and a compliant member connecting the top of said bearing assembly solely to said projection, said member being stiff in a direction of actuation forces applied to said bearing assembly when said actuator rotates said arm, the compliance of said member being in a direction transverse to said direction of said actuation forces.

2. The disk drive recited in claim 1 wherein said member is compliant in the vertical direction and stiff in the horizontal direction.

3. The disk drive recited in claim 2 wherein said projection is a casting which is unitary with said base.

4. The disk drive recited in claim 3 wherein said compliant member is a strap connecting the top of said bearing assembly with the top of said casting.

5. The disk recited in claim 1 wherein said actuator further comprises a rotary coil motor including said coil.

6. The disk drive recited in claim 5 wherein said actuator arm carries said read/write heads at one extremity thereof and said coil motor at the other extremity.

7. The disk drive recited in claim 6 wherein said actuator has a dog-leg between the extremities thereof.

8. The disk drive recited in claim 7 wherein said shelf adds mass under said coil to better balance said arm.

9. The disk drive recited in claim 8 wherein said shelf extends entirely across the bottom edge of said Other side of said body between said tines of said fork.

10. The disk drive recited in claim 1 wherein said shelves further include a shelf at the extremity of each of said tines.

* * * * *

UNITED STATES PATENT AND TRADEMARK OFFICE
CERTIFICATE OF CORRECTION

PATENT NO. : 5,590,002
DATED : December 31, 1996
INVENTOR(S) : Allen T. Bracken and Edward L. Rich It is certified that error appears in the above-indentified patent and that said Letters Patent is hereby corrected as shown below:

Col. 4, line 20, the word "Other" should read --other--.

Signed and Sealed this

Twenty-fifth Day of March, 1997

Attest:

BRUCE LEHMAN

*Attesting Officer*        *Commissioner of Patents and Trademarks*